Patented Apr. 19, 1949

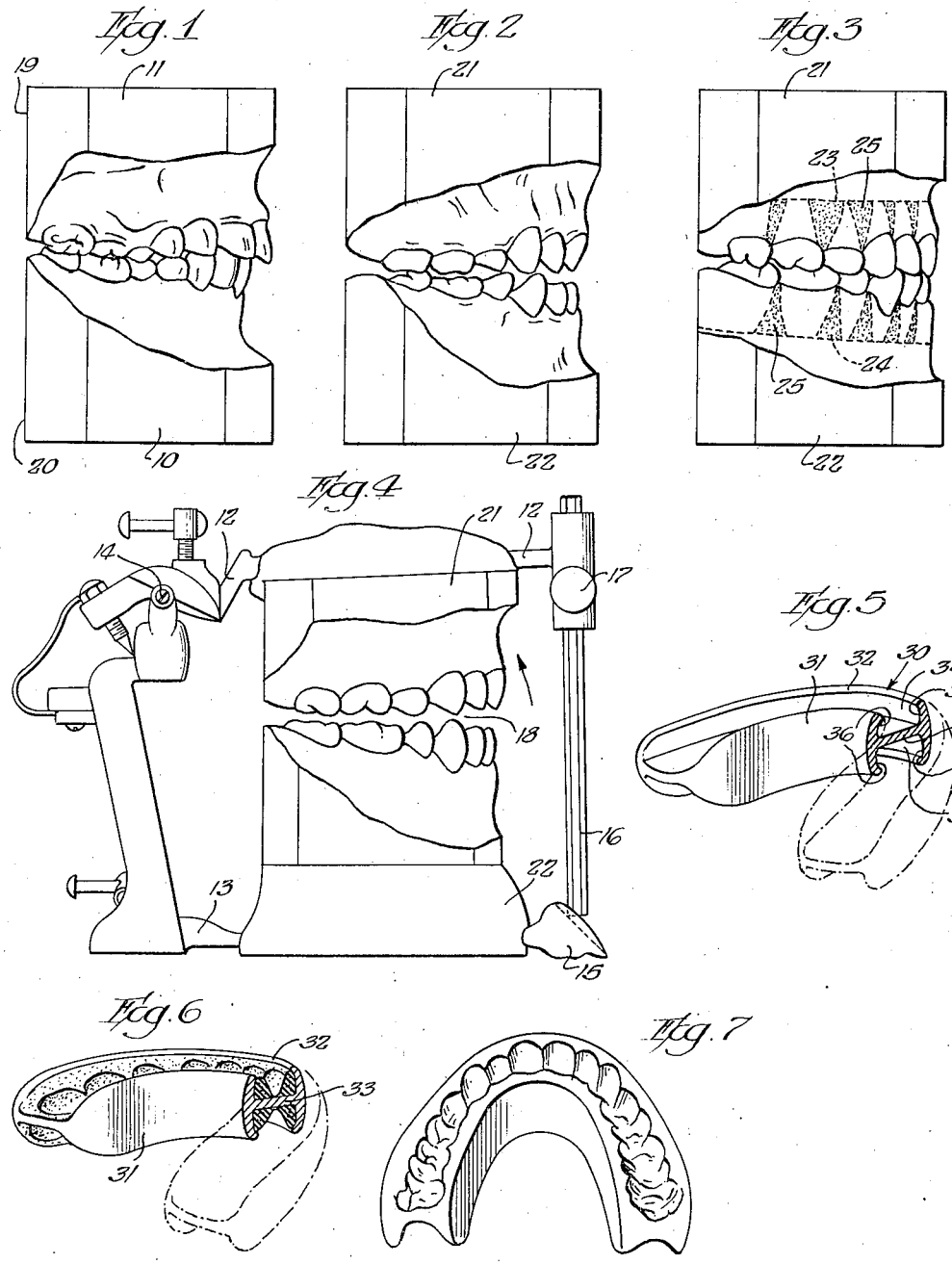

2,467,432

UNITED STATES PATENT OFFICE 2,467,432

METHOD OF MAKING ORTHODONTIC APPLIANCES AND OF POSITIONING TEETH

Harold D. Kesling, La Porte, Ind.

Original application July 23, 1943, Serial No. 495,870. Divided and this application September 16, 1946, Serial No. 697,181

6 Claims. (Cl. 32—14)

The present invention relates to tooth positioning appliances, and is particularly concerned with the provision of improved appliances which are adapted to be used to maintain or bring the teeth of a user of such an appliance into a predetermined ideal or desirable position without the necessity for the use of metallic bands, wires, or any of the other appliances of the prior art.

The present application on methods of making orthodontic appliances and methods of positioning teeth is a division of my prior application Serial No. 495,870, filed July 23, 1943, on Tooth positioning appliances.

In the use of the appliances of the prior art for orthodontia, there are certain limitations in the positioning of teeth on account of the interference by bands or other appliances, which must pass between the teeth.

In attempting to position teeth with the appliances of the prior art, forces are exerted on one or more anchor teeth, which tend to displace one or more of the anchor teeth. Such devices of the prior art are inconvenient and unattractive, and are usually left on the teeth day and night during the time when the teeth are being treated.

One of the objects of the present invention is the provision of an improved tooth positioning device which is adapted to effect a positioning of teeth by means of the application of a more moderate force, which, nevertheless, is effective in eventually bringing the teeth into substantially ideal position for the particular patient.

Another object of the invention is the provision of a tooth positioning appliance of the class described which is not only adaptable for the correction of tooth positions that have been wrongly positioned for a considerable period of time, but which are also adaptable for the use of a vast number of users whose teeth may be gradually getting out of position and by whom the appliance may be used for maintaining the proper position of the teeth by using the device at regular intervals.

Another object of the invention is the provision of an improved technique of positioning teeth and improved apparatus by means of which the technique can be carried out.

Another object of the invention is the provision of an improved tooth positioning device which is adapted to produce better results than can be produced by any other known devices or technique, and which may also be used to prevent mouth breathing.

Other objects and advantages of the invention will be apparent from the following description and the accompanying drawings, in which similar characters of reference indicate similar parts throughout the several views.

Referring to the single sheet of drawings accompanying the specification:

Fig. 1 is a side elevational view of a plaster model, showing the condition of the teeth of a patient prior to the beginning of treatment;

Fig. 2 is a similar plaster cast, showing the condition of the patient's teeth after a preliminary period of treatment and just prior to the final step of treatment with the tooth positioning appliance of the invention;

Fig. 3 is another similar elevational view of the same plaster cast of Fig. 2 as it appears after the teeth have been dissected from the cast, and reset upon the same base and held by means of wax or other suitable material, showing the teeth in the ideal position in which they are finally to be positioned;

Fig. 4 is a similar elevational view of the same plaster cast as Fig. 3, suitably articulated, with the bite opened by means of any suitable form of anatomical articulator to the position of normal rest for this patient, leaving a free-way space between the upper and lower teeth;

Fig. 5 is a fragmentary view in perspective of a tray which may be used for taking the impression of both the upper and lower teeth at the same time, according to the present technique;

Fig. 6 is a similar view of the tray of Fig. 5 as it appears after its upper and lower grooves have been provided with a suitable amount of impression material and the impression has been taken, thereby forming a pattern for the final tooth positioning device; and Fig. 7 is a view in perspective of the final tooth positioning device, which is made of rubber or other plastic material from said pattern of Fig. 6, and which is adapted finally to bring the teeth to the ideal position of Fig. 3.

Referring to Fig. 1, the plaster cast of the teeth of the patient shown in this figure is an illustration of teeth which are much in need of orthodontic treatment. This plaster cast is made in the usual manner, having a plaster base 10 for the lower teeth and a similar plaster base 11 for the upper teeth.

While the present tooth positioning appliances may be used for changing the position of teeth from the position of Fig. 1 to that of Fig. 3 by using a multiplicity or a plurality of different steps and making intermediate tooth positioning devices, which are to move the teeth only a fraction of the way toward their final position, the example which I have selected to illustrate the invention contemplates the use of the positioning devices of the prior art to change the position of the teeth from that of Fig. 1 to approximately that of Fig. 2.

The plaster casts of Figs. 2 to 4 are preferably of the type having plane surfaces 19, 20 on the left faces of the cast so that these surfaces may be laid upon a table or other suitable support, with the teeth in such position as they would ordinarily assume if properly articulated.

The cast of Fig. 2 may be made by taking an impression in the usual way and by making a plaster mold of the upper teeth carried by a base 21 and the lower teeth carried by the base 22.

The model of Fig. 2 may be either a cast of teeth, the positions of which are not far from the desired or proper position, or the cast of Fig. 2 may be an example of the best that can be done by way of orthodontia by means of the methods of the prior art, utilizing bands, wires, etc.

The purpose of the present invention is to produce even better results and to provide an appliance which can be worn at regular intervals or at such periods of time when the patient may be asleep or resting, or where it may be worn in private and removed when the patient is in public.

The next step in the making of this appliance and in the technique is that the respective teeth carried by the upper base 21 and the lower base 22 are dissected from these bases. This dissection may be accomplished by means of a small scroll saw or vibrating scroll saw, as follows: A cut may be made down between each of the teeth with the saw. The saw is then turned laterally at the base of one of these cuts, and a cut may be made along the horizontal dotted lines 23, 24. This will separate each tooth from the other teeth and from the base, and the teeth may then have their lower portions cut down to resemble the natural root for that particular tooth. A sufficient amount of wax or other suitable material may then be placed upon each of the bases, and the teeth may be reassembled with the bases and held in place by the wax, the wax being indicated by the numeral 25 in the spaces between the tooth roots. Each of the plaster teeth is then replaced on its proper base and in its proper position; but the position of the tooth is so altered by the operator as to assume the ideal position for that particular tooth in that particular assembly, bearing in mind the formation of the jaw structure of the patient and the facial and racial characteristics of each patient.

The teeth are secured in place by means of wax or some other suitable material which is initially plastic and which has suitable qualities for adhering to the plaster.

Fig. 3 then is a plaster cast of the teeth after they have been reassembled with their plaster bases in the ideal position in which it is desired to position the teeth.

Fig. 4 is a similar view of the same plaster cast as Fig. 3, with the teeth properly spaced for the position of normal rest for this patient, by means of a suitable articulator. Such an articulator may have the base 21 secured to an arm 12, and base 22 secured to an arm 13. These arms are pivoted together at the point 14, and lower arm 13 is provided with a suitable lower stop member 15 for engaging an adjustable rod stop member 16 carried by the upper arm 12. The rod 16 is so adjusted by a set screw 17 that the jaws of the plaster cast assume the ordinary position of rest, with a free-way or space 18 between them. This free-way space 18 between the upper and lower teeth serves the purpose of the present tooth positioning appliance of allowing room for sufficient material in the appliance to secure an accurate impression of every tooth.

Referring now to Fig. 5, this is a view in perspective of a suitable tray, which may be used for taking the next impression of the teeth and for providing a pattern for the making of the tooth positioning appliance.

This tray is indicated in its entirety by the numeral 30, and it comprises a rear wall 31 and a front wall 32 joined by the transverse wall 33 that passes between the teeth. The tray 30 has an upper groove 34 between the walls and a lower groove 35 between the front and rear walls, and the size and shape of the groove varies according to the desired shape of the finished appliance. The walls of the tray are preferably undercut, as indicated at 36, to hold the impression material in the tray.

The proportions of this tray are made with a view to making it the pattern for the tooth positioning appliance, which will later be worn in the mouth; and therefore it is desirable to dispense with any unnecessary bulk in the design of the tray.

The tray 30 is preferably made of a suitable relatively stiff material which is initially plastic and which is moldable so that the tray may be molded to correspond substantially to the arch of the teeth of the patient without having more than a few sizes of trays. For example, there may be a number of sizes for children; but for adults, possibly large, medium, and small sizes of trays may be made to accommodate most adults.

In the next step of making the appliance the upper and lower grooves of the tray are nearly filled with a suitable amount of impression material, and the material is disposed so that when the tray is placed between the teeth of the plaster cast of Fig. 4, and the articulated teeth are brought into the position of Fig. 4, a true and accurate impression will be made of the teeth in the position to which it is desired to move them.

Fig. 6 is a view in perspective of such an impression and tray after the impression has been taken, and the device of Fig. 6 serves as a pattern for the making of the tooth positioning appliance.

The next steps in the making of the appliance are the usual ones in making a casting, as a mold is made from the tray and impression of Fig. 6; and the mold is filled with a suitable supply of resilient material, such as live rubber, which is shaped and cured in the mold to make the appliance of Fig. 7.

Fig. 7 shows the tooth positioning appliance when completed, and it is a member of live resilient molded material, having a small amount of material between all of the upper and lower teeth and having sockets for all of the tooth crowns, the sockets being of the proper tooth shape, but being in such position that the walls of the sockets, and the resilient material of which the whole appliance is constructed, constantly tend to move the teeth toward or into that ideal position which is represented by the reconstruction of Fig. 3.

I have carried such operations to completion and have found that better results can be attained by means of such a tooth positioning appliance than with any of the appliances of the prior art, and I am confirmed in my conclusions as to the results by the observations of many other specialists in this profession who have observed the plaster casts of my finished work.

The tooth positioning appliance of Fig. 7 may be worn at night by the patient, and while he is sleeping; and it is found that in a short time the patient will become accustomed to wearing the appliance, which also prevents mouth breathing, due to the fact that the mouth is closed on the appliance during sleep. Breathing through the nose is then a matter of necessity, and the present appliance may also be used to prevent undesirable breathing noises during sleeping. Other patients may wear the appliance for a certain number of minutes or fraction of an hour or a certain number of hours at regularly stated intervals; and others whose teeth have been in proper position, but now appear to drift, or to become misaligned, may use the appliance for maintaining the proper position of their teeth by wearing it a short time each day.

While I have illustrated an appliance and described the technique for producing only the last or final change to the desired ideal position, it will also be evident that this appliance and technique may be employed in a plurality of steps for moving the teeth step by step from any extreme position to the desired and final position; but in such case it will obviously be necessary to make a number of different appliances, each representing one step of attainment toward the final positioning of the teeth.

It will thus be observed that I have invented a new technique and a new apparatus for carrying out this technique, comprising a tooth positioning appliance which may be worn with less discomfort than the devices of the prior art and which may be so constructed as to exert only the most moderate forces upon the teeth to be positioned.

The reaction of these forces is not against one or two other teeth, as in the devices of the prior art, but against the entire denture, and the tendency of this tooth positioning appliance is to bring the teeth to the ideal position with a minimum amount of discomfort to the wearer. In the application of the appliance to the teeth of the patient, it is, of course, necessary to see that the teeth of the patient are actually seated in the recesses of the appliance when the appliance is being worn. For this purpose it may be necessary, where the appliance is drawing two teeth together, to stretch the appliance slightly adjacent these two teeth as it is being applied to the teeth, while forcing the teeth into their respective sockets. In other cases, where teeth are to be separated, it may be necessary to compress it slightly at a predetermined portion of the sockets, to bring the sockets into alignment with the teeth on which they are to act.

The present tooth positioning device does not have the limitations as to position of the teeth which are placed upon the operator by the use of bands that must pass between the teeth, since this device does not require any parts passing between particular teeth.

The present device may be kept more sanitary than devices which are relatively permanently attached to the teeth, as the present device may be cleaned before and after every using. It has been found that where the present invention is employed, the unsightly metal wires and bands of the conventional tooth positioning devices of the prior art may be removed from the teeth of the patient much sooner, and the present device usually produces a finished job in from four to six months.

This device eliminates a lot of dental adjustments that were previously necessary for the final artistic positioning of the teeth, thus reducing the operator's chair time, and the present invention also produces a superior result.

The appliance not only permits each orthodontist to prearrange the teeth for each individual case under treatment according to the type, but it also enables the orthodontist to produce this predetermined arrangement of teeth for the patient being treated. The invention not only permits the orthodontist to position each tooth properly, but the form of the arch may also be predetermined and corrected.

Besides permitting the positioning of teeth and the adjustment of the arch form, the present appliance is also very efficient for the retention of the teeth in their proper form after the teeth assume the desired position.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. The method of making a tooth positioning appliance which comprises taking an impression of the upper and lower teeth, forming a cast model of said teeth, dissecting the teeth from said cast model, and resetting the teeth in the desired position, and making a resilient solid member having recesses shaped and located to the desired position of said teeth.

2. The method of making a tooth positioning device, comprising taking an impression of the upper and lower teeth, with the teeth spaced a predetermined amount substantially equal to the free-way, forming a cast of the teeth from said impression, dissecting predetermined teeth from said cast, repositioning the dissected cast teeth on the cast in the desired position, forming a bendable tray with a wall between the upper and lower teeth, and walls extending upwardly and downwardly and inside the upper and lower teeth, placing a predetermined amount of impression material in the upper and lower grooves formed by the walls of said tray, taking an impression of the re-positioned and other cast teeth in the cast, with the upper and lower teeth spaced by the wall of the tray between them, trimming off the excess material from said impression to form a pattern, forming a mold from said pattern, and molding a resilient tooth positioning device of live resilient material having sockets for substantially all of the upper and lower teeth, with the sockets in the position to which it is desired to move predetermined of said teeth.

3. A method of making a tooth positioner which comprises making a cast model of the teeth of the patient in assembled relation upon upper and lower bases, dissecting predetermined teeth from said upper and lower bases with sufficient material to form a root, forming a suitable root on the dissected teeth, remounting the dissected teeth upon their respective bases in the assembly with the teeth located and positioned and oriented in the proper predetermined position for an ideal tooth assembly, placing an arched tray having an upper and lower groove, and said grooves being filled with impression material between the teeth of said model, and taking an impression in said impression material of the teeth in the predetermined positions to which it is desired to move them, trimming the tray and impression material to remove excess impression material and form a pattern, forming a mold from said pattern, and using said mold to form a resilient, live, stretchable, and compressible member conforming substantially to the tray with its impression after trimming.

4. The method of making a tooth positioning appliance comprising making a cast of the upper and lower teeth of the patient, said cast having the teeth in the natural positions corresponding to their positions in the patient's mouth, which are to be corrected, dissecting from said cast predetermined teeth and re-mounting said latter teeth on said cast in the corrected positions to which the patient's said teeth are to be moved, and forming an integral member of resilient, stretchable and deformable material having the cavities for the upper and lower teeth of the patient with the cavities for said predetermined teeth in the said corrected positions, so that said member may be deformed to receive the upper and lower teeth of the patient and gripped between the teeth to impose resiliently applied force on the teeth to orient said predetermined teeth in said corrected position.

5. The method of making a tooth positioning appliance which comprises taking an impression of the teeth, forming a cast model of said teeth, displacing teeth of the cast model to positions representing the desired positions of teeth in the mouth of the user of the appliance, and making from said altered cast model a resilient solid member having recesses shaped and located to said desired position of said teeth.

6. The method of making a tooth positioning appliance which comprises taking an impression of the teeth in positions they occupy in the mouth of the wearer of the appliance, forming a cast model of said teeth, displacing teeth of the cast model to predetermined positions displaced from the positions of teeth in the mouth of the user of the appliance, and making from said altered cast model a resilient solid member having recesses shaped and located in the displaced positions of said model so that, when forced onto the teeth of the user, it will apply corrective forces thereto.

HAROLD D. KESLING.

REFERENCES CITED

The following references are of record in the file of this patent:

UNITED STATES PATENTS

| Number | Name | Date |
| --- | --- | --- |
| 646,629 | Sugatt | Apr. 3, 1900 |
| 1,146,264 | Kelly | July 13, 1915 |
| 1,302,004 | Brown | Apr. 29, 1919 |
| 1,518,075 | Kesling | Dec. 2, 1924 |
| 1,691,785 | Remensnyder | Nov. 13, 1928 |
| 2,257,329 | Britt | Sept. 30, 1941 |
| 2,259,160 | Glaser | Oct. 14, 1941 |
| 2,305,784 | Harvath et al. | Dec. 22, 1942 |